United States Patent [19]

Hoffmann et al.

[11] 4,066,498

[45] Jan. 3, 1978

[54] SHUT-OFF AND SAFETY DEVICE FOR A LIVE STEAM LINE IN A PRESSURIZED WATER REACTOR

[75] Inventors: Jürgen Hoffmann; Albrecht Hofmockel; Günther Lepie, all of Erlangen, Germany

[73] Assignee: Kraftwerk Union Aktiengesellschaft, Mulheim (Ruhr), Germany

[21] Appl. No.: 554,450

[22] Filed: Mar. 3, 1975

[30] Foreign Application Priority Data

Mar. 1, 1974 Germany .............................. 2409867

[51] Int. Cl.² .............................................. G21C 9/00
[52] U.S. Cl. .................................... 176/38; 137/458; 176/60
[58] Field of Search ................. 176/37, 38, 65, 87; 137/456, 458

[56] References Cited

U.S. PATENT DOCUMENTS

| | | | |
|---|---|---|---|
| 2,912,997 | 11/1959 | Griswold | 137/456 |
| 3,529,630 | 9/1970 | Podolsky | 137/630.13 |
| 3,734,134 | 5/1973 | Vogeli | 137/637.2 |
| 3,842,858 | 10/1974 | Bobo | 137/458 |

FOREIGN PATENT DOCUMENTS 2,345,580   10/1973   Germany .............................. 176/38

Primary Examiner—Verlin R. Pendegrass
Assistant Examiner—Ralph Palo
Attorney, Agent, or Firm—Herbert L. Lerner

[57] ABSTRACT

A pressurized water nuclear reactor having a safety vessel containing a steam generator from which a live steam line extends, a shut-off and safety device includes valve means having a displaceable valve member connected in the live steam line within the safety vessel, and control piston means connected to the valve member for controlling opening and closing of the valve means, the control piston means comprising a control cylinder and a control member displaceable in the control cylinder and having a pair of opposite sides having working surfaces respectively subjectible to differences of pressure applied thereto in respective portions of the control cylinder located adjacent thereto for displacing the control member in respective directions so as to displace the valve member in corresponding directions to open and close the valve means, the portions of the control cylinder located adjacent the sides of the control member having means for effecting a pressure difference between the respective cylinder portions, means for changing the pressure difference so as to close the valve means in response to occurrence of a leak in the live steam line, and means for limiting the pressure difference to a value dependent upon the highest permissible pressure in the steam generator, the valve member being displaceable by the highest permissible pressure in the steam generator to open the valve means.

3 Claims, 1 Drawing Figure

U.S. Patent   Jan. 3, 1978   4,066,498
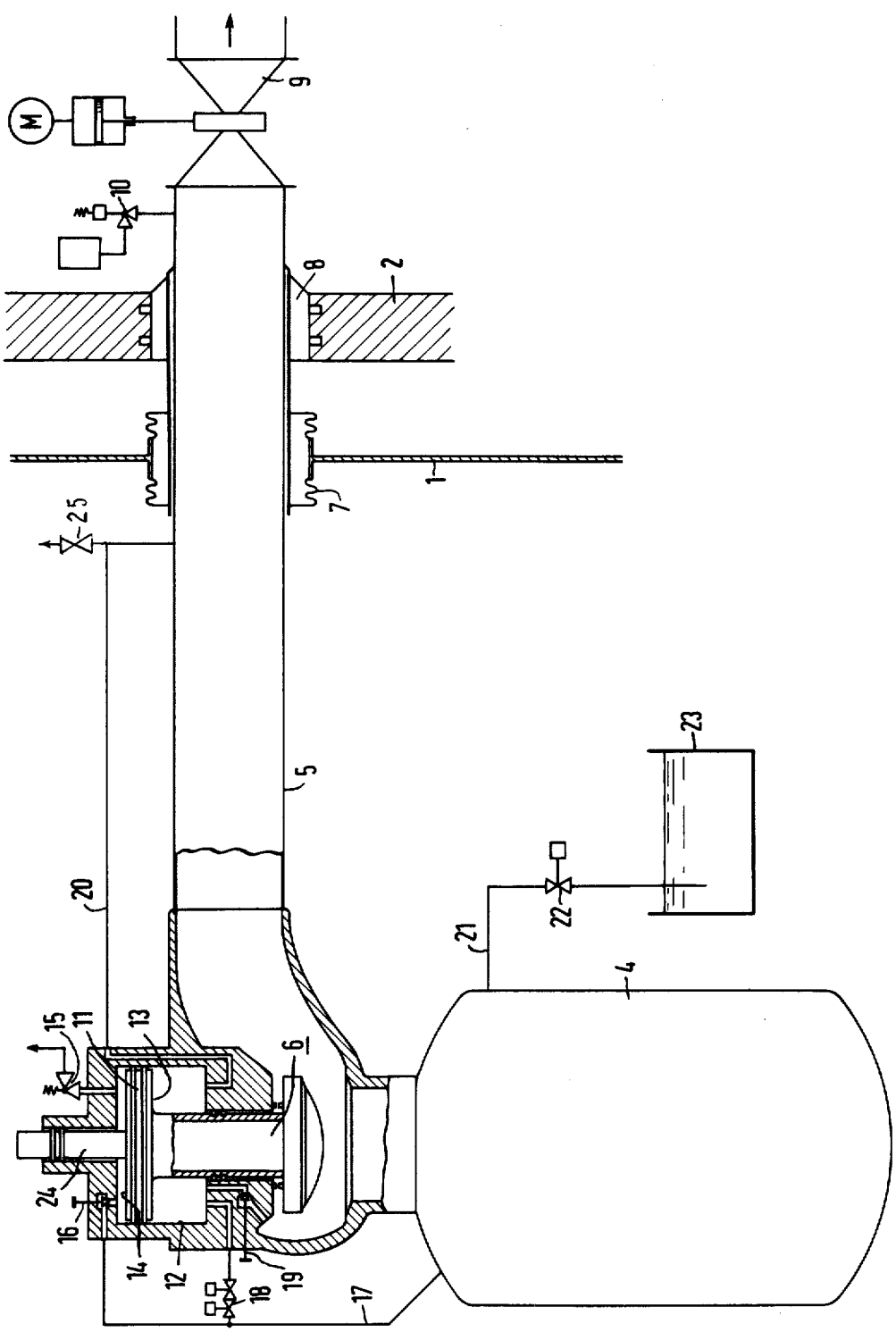

SHUT-OFF AND SAFETY DEVICE FOR A LIVE STEAM LINE IN A PRESSURIZED WATER REACTOR

The invention of the instant application relates to a shut-off and safety device for a live steam line in a pressurized water reactor. Such reactors are provided with a safety containment vessel in the interior of which there are located, on the one hand, the nuclear reactor for heating pressure water and, on the other hand, steam generators.

The steam generators are heat exchangers provided with heating tubes through which the pressure water flows. At the casing side of the heat exchangers, the heating tubes are filled with feedwater which is to be vaporized. The vaporized feedwater or steam is discharged from above and is conducted through live steam lines out of the safety vessel and to a turbine of the nuclear reactor plant.

If a relatively large leak occurs for any reason in such a live steam line and steam escapes therefrom, this can result in an abrupt drop in pressure which, through suitable conventional safety devices, causes a shutdown of the nuclear reactor. If the leak is located in the interior of the usually steel safety vessel, the steam escaping from the leak location remains in the interior of the safety vessel. If the leak should occur, however, at a location of the respective live steam line or pipe outside the safety vessel, the steam would then escape into the atmosphere.

No danger exists, however, to the surroundings of the nuclear power plant in the latter case, because the steam normally contains no radioactive substances. If one assumes, however, that for any reason weak spots are located in one or more of the heating tubes of the steam generator, which would permit the formation of a leak when a sudden pressure drop or release occurs, then a leak may exist simultaneously in the heating tubes of the steam generator and in the live steam line outside the safety vessel. In such a situation, it is theoretically possible that radioactive substances may escape into the free air.

If it is desired to prevent such an escape of radioactive pollutants, a shut-off valve should previously be installed in the live steam line in the interior of the safety vessel. If such a shut-off valve becomes closed, the danger again arises that, due to the existing heat supply of the pressure water, the pressure in the steam generator will rise unduly. In order to prevent such an occurrence, it would be necessary to provide a safety valve which permits blow-off of the steam out of the safety vessel if an unduly high pressure is produced in the steam generator. In order to provide such a safety valve with a blow-off line leading to the outside, however, one must first provide additional passages through the wall of the safety vessel and then one must protect the blow-off line against the possible occurrence of a break therein.

It is accordingly an object of the invention to provide a shut-off and safety device for a steam generator in the interior of a safety vessel of a pressurized water reactor which permits, on the one hand, the shut-off of the live steam line in the interior of the safety vessel if a leak should occur in the live steam line and, on the other hand, to blow off excess steam to the outside without any additional passages when the pressure in the steam generator becomes excessive.

With the foregoing and other objects in view, there is provided in accordance with the invention, in a pressurized water nuclear reactor having a safety vessel containing a steam generator from which a live steam line extends, a shut-off and safety device comprising valve means including a displaceable valve member connected in the live steam line within the safety vessel, and control piston means connected to the valve member for controlling opening and closing of the valve means, the control piston means comprising a control cylinder and a control member displaceable in the control cylinder and having a pair of opposite sides having working surfaces respectively subjectible to differences of pressure applied thereto in respective portions of the control cylinder located adjacent thereto for displacing the control member in respective directions so as to displace the valve member in corresponding directions to open and close the valve means, the portions of the control cylinder located adjacent the sides of the control member having means for effecting a pressure difference between the respective cylinder portions, means for changing the pressure difference so as to close the valve means to response to occurrence of a leak in the live steam line, and means for limiting the pressure difference to a value dependent upon the highest permissible pressure in the steam generator, the valve member being displaceable by the highest permissible pressure in the steam generator to open the valve means.

Other features which are considered as characteristic for the invention are set forth in the appended claims.

Although the invention is illustrated and described herein as shut-off and safety device for a live steam line in a pressurized water reactor, it is nevertheless not intended to be limited to the details shown, since various modifications may be made therein without departing from the spirit of the invention and within the scope and range of equivalents of the claims.

The invention, however, together with additional objects and advantages thereof will be best understood from the following description of the single drawing which is a diagrammatic view of the shut-off and safety device for a live steam line in a pressurized water reactor.

Referring now to the drawing, there is shown in the interior of a safety containment vessel 1, which is surrounded by a concrete enclosure or shield 2, a steam generator 4 having a live steam line 5 in which a valve 6 is connected. The live steam line 5 extends from the containment vessel and the surrounding concrete shielding 2 through passageways 7 and 8, respectively. The live steam line 5, outside the shielding 2, is closable by a conventional slider valve 9. Furthermore, a conventional safety valve 10 is connected to the live steam line 5 outside the safety vessel 1 and shielding 2. The valve 6 serves to shut-off or block the live steam line 5 directly in the vicinity of the steam generator 4 and also serves simultaneously as a safety device against overpressure in the steam generator 4. These functions of the valve 6 are performed as a result of the control exerted upon the valve 6 by a control piston 11, which is displaceably mounted in a control cylinder 12 and is mechanically connected to the movable valve member or plate of the valve 6. The control piston 11 is provided, at the lower end thereof, as viewed in the FIGURE of the drawing with a piston surface 13 which is subjectible to pressure in the piston chamber adjacent thereto which causes the piston to act in a direction in which the valve member 6 opens the valve opening to the steam generator 4. At the upper end of the control piston 11, as viewed in the FIGURE, a piston surface 14 is provided which is, in turn, subjectible to pressure in the part of the piston chamber adjacent thereto which causes the piston 11 to act in a direction in which the valve member 6 closes the valve opening to the steam generator 4. That portion of the chamber of the control cylinder 12 which borders on the valve-closing piston working surface 14 is connected through a safety valve 15 with the interior of the safety containment vessel 1 and is, moreover, connected by an adjusting throttle 16 and a connecting line 17 with the steam generator 4.

That portion of the chamber of the control cylinder 12 which borders on the valve-opening piston surface 13 is connected firstly through two serially-connected opening valves 18 with the connecting line 17 and secondly through an adjusting throttle 19 with the valve chamber which is located between the live steam line 5 and the steam generator 4. Furthermore, the chamber portion of the control cylinder 12 bordering on the valve-opening piston surface 13 is connected through a control line 20 to a location of the live steam line 5 which is located at a distance from the valve 6 in the vicinity of the wall of the safety containment vessel 1. It is also possible to control or regulate the pressure in the control line 20 through a diagrammatically illustrated valve 25 conventionally controlled by a pressure drop in the live steam line 5.

A relief line 21, moreover, extends from the steam generator 4 through a shut-off valve 22 into a vessel 23. The relief line 21 is of such size that, in the event of a leak in some of the heating tubes in the steam generator 4, it can discharge therefrom the pressure water emerging from the leaking heating tubes.

Assuming that a break occurs in the live steam line 5 outside the safety containment vessel 1 forward or upstream of the slider valve 9, then the pressure in the live steam line 5, at least in the vicinity of the wall of the safety vessel 1, abruptly drops. The valve 6, that had been open until then, is closed because the pressure drop in the control line 20 reduces the pressure in the part of the valve chamber located adjacent the valve-opening piston side 13, and the pressure, therefore, in the part of the valve chamber located adjacent the valve-closing piston side 14 thereby predominates. As a result of the closing of the valve 6, the pressure drop in the interior of the steam generator 4 becomes limited i.e. further decrease in pressure ceases. From this alone, danger of consequent damage to the heating tubes in the interior of the steam generator 4 is virtually avoided. Through conventional safety devices not illustrated in the drawing, the nuclear rector plant, in this case, is shut down due to the pressure drop in a live steam line, and the thermal energy which continues to accumulate is blown off to the outside through the remaining steam generators present in the nuclear reactor plant and their live steam lines. In this case, neither the valve 6 in the live steam line 5 nor the shut-off valve 22 opens. The pressure in the interior of the steam generator 4 will increase and exceed the inner pressure prevailing before the occurrence of the disruption, yet will not attain the highest permissible pressure.

In the case where either no remaining steam generators exist or blow-off of the steam of the remaining steam generators is inadequate, it is possible that the pressure in the steam generator 4 may threaten to rise above the permissible valve. This pressure also prevails in the part of the chamber of the control cylinder 12 located adjacent the valve-closing piston side 14. The part of the control cylinder chamber located adjacent the valve-closing piston side 14, however, is connected to the safety valve 15, which is responsive when the highest permissible pressure is attained in the steam generator 4 and blows off into the interior of the safety containment vessel 1. The pressure in the part of the cylinder chamber located adjacent the valve-closing piston side 14 is thereby limited. If the pressure should increase further in the steam generator 4, the valve 6 will open and the pressure rise can be limited by the blow-off of steam through the leak location or through the safety valve 10. As soon as the pressure in the interior of the steam generator 4 has again diminished, the safety valve 15 closes and, due to the greater working surface of the control piston 11 as compared to that of the valve seat of the valve 6, the valve will close again. Thus, the valve 6 acts on the one hand, as a shut-off valve and, on the other hand, as a safety valve against too high overpressure in the steam generator 4. To open the valve 6 during operation of the nuclear power plant, the opening valves 16, which have actuating knobs that, for reasons of safety during maintenance, can be placed at separate locations, are actuated so that the pressure which prevails in the interior of the steam generator 4 is then also present in the parts of the cylinder chamber located at both valve-opening and valve-closing sides 13 and 14, respectively, of the control piston 11.

The control piston 11 has a piston rod 24 which then projects out of the control cylinder 12. The force corresponding to the cross-sectional area of the piston rod 24 and to the pressure below the somewhat conical valve member or plate 6 i.e. within the valve chamber at that location, causes the control piston 11 and the conical valve member 6 to be displaced into the upper limiting position thereof as viewed in the FIGURE, and the valve 6 is fully opened. The pressure in the live steam line 5 assures that, over the cross section of the piston rod 24, the force acting in the direction to open the valve 6 will also be maintained after the opening valves 18 have been closed.

We claim:

1. In a pressurized water nuclear reactor having a safety vessel containing a steam generator from which a live steam line extends, a shut-off and safety device comprising valve means including a displaceable valve member connected in the live steam line within the safety vessel, and control piston means connected to said valve member for controlling opening and closing of said valve means, said control piston means comprising a control cylinder, a control member displaceable in said control cylinder and a piston rod connecting said control member to said valve member, said control member having a pair of opposite sides having working surfaces respectively subjectible to different pressure applied thereto in respective portions of said control cylinder located adjacent thereto for displacing said control member and said piston rod in respective directions so as to displace said valve member in corresponding directions to open and close said valve means, said piston rod being connected to the one working surface of said control member that is subjectible to a relatively greater steam pressure for opening said valve means, the portions of said control cylinder located adjacent the sides of said control member having means for effecting a pressure difference between the respective cylinder portions, means for changing said pressure difference so as to close said valve means in response to occurrence of a leak in the live steam line, means for limiting the pressure difference to a value dependent upon the highest permissible pressure in the steam generator, said valve member being displaceable by said highest permissible pressure in the steam generator to open said valve means, means for connecting both said control cylinder portions to the steam generator, throttling means connected in said connecting means for throttling steam pressure therein, the other working surface of said control member subjectible to a relatively greater steam pressure for closing said valve means having an area smaller than the total area of the one working surface of said control member inclusive of the area of the piston rod connected thereto, said pressure-difference changing means comprising a control line connecting the live steam line to the one portion of said control cylinder wherein pressure is applicable on said one working surface of said control member for opening said valve means whereby a pressure drop in the live steam line resulting from the occurrence of a leak therein reduces the pressure in said one portion of said control cylinder and closes said valve means, said pressure-difference limiting means comprising a safety valve connected to the other portion of said control cylinder wherein pressure is applicable on said other working surface of said control member for closing said valve means, whereby a pressure exceeding the highest permissible pressure in the steam generator increases the pressure in said other portion of said control cylinder through the respective connecting means thereto and activates said safety valve to relieve the pressure, said valve member being directly subjectible to steam pressure in the steam generator for opening said valve means so as to relieve pressure exceeding the highest permissible pressure in the steam generator in addition to said pressure-difference limiting means.

2. Device according to claim 1 wherein the other control cylinder portion located adjacent the other side of said control member is connected to a location of said live steam line disposed in vicinity of the wall of the safety vessel.

3. Device according to claim 1 wherein the other control cylinder portion located adjacent the other side of said control member is connected to the interior of the safety vessel through a valve actuatable in response to a pressure drop in the live steam line.

* * * * *